(12) United States Patent
Smith (10) Patent No.: US 7,903,914 B2
(45) Date of Patent: Mar. 8, 2011

(54) METHOD AND APPARATUS FOR MANUFACTURE OF A NON-HELICAL SUBSEA UMBILICAL

(75) Inventor: Ronald E. Smith, Seabrook, TX (US)

(73) Assignee: Deep Down, Inc., Channelview, TX (US)

( * ) Notice: Subject to any disclaimer, the term of this patent is extended or adjusted under 35 U.S.C. 154(b) by 527 days.

(21) Appl. No.: 12/122,864

(22) Filed: May 19, 2008

(65) Prior Publication Data

US 2009/0285634 A1 Nov. 19, 2009

(51) Int. Cl.
*G02B 6/44* (2006.01)
(52) U.S. Cl. .......................... 385/100; 385/101
(58) Field of Classification Search .............. 385/100, 385/101
See application file for complete search history.

(56) References Cited

U.S. PATENT DOCUMENTS

| | | | |
|---|---|---|---|
| 3,526,086 A | 9/1970 | Morgan | |
| 4,196,307 A | 4/1980 | Moore et al. | |
| 4,726,314 A | 2/1988 | Ayers | |
| 5,813,106 A * | 9/1998 | Haug et al. | 29/429 |
| 5,902,958 A | 5/1999 | Haxton | |
| 6,102,077 A | 8/2000 | Legallais et al. | |
| 6,472,614 B1 | 10/2002 | Dupont et al. | |
| 6,538,198 B1 | 3/2003 | Wooters | |
| 6,556,780 B2 | 4/2003 | Mjelstad et al. | |
| 6,612,370 B1 | 9/2003 | Jahnsen et al. | |
| 7,047,616 B2 | 5/2006 | Bjerke et al. | |
| 7,158,703 B2 | 1/2007 | Mjelstad | |
| 7,239,781 B2 | 7/2007 | Chartier et al. | |
| 2002/0122664 A1 | 9/2002 | Mjelstad et al. | |
| 2006/0193698 A1 | 8/2006 | Mjelstad et al. | |

FOREIGN PATENT DOCUMENTS

| | | |
|---|---|---|
| GB | 2038988 | 7/1980 |
| GB | 2219063 | 11/1989 |

OTHER PUBLICATIONS

Oceaneering International, Inc, Subsea Umbilical Systems the Depths of Reliability, advertising brochure, 2008.

* cited by examiner

*Primary Examiner* — Uyen-Chau N Le
*Assistant Examiner* — Kajli Prince
(74) *Attorney, Agent, or Firm* — Husch Blackwell LLP; Samuel Digirolamo (57) ABSTRACT

A method and apparatus to produce a non-helically wound subsea umbilical is disclosed. The apparatus to produce a non-helically wound umbilical may be portable to facilitate manufacturing of subsea umbilicals in remote locations. This apparatus is smaller and more economical to build and operate than conventional cabling machines that currently are used by many manufactures to produce helically wound subsea umbilicals.

11 Claims, 7 Drawing Sheets

METHOD AND APPARATUS FOR MANUFACTURE OF A NON-HELICAL SUBSEA UMBILICAL

DESCRIPTION OF THE PRIOR ART

Conventional subsea umbilicals are multi-part cables used in the oil and gas business to connect a host to a subsea production facility. The host may be a floating production storage and offloading vessel, (FPSO) a floating rig, or a shore based facility. The host is manned, and the subsea production facility is unmanned. The subsea umbilical may include a) tubing for various fluids including hydraulic fluid, and/or chemicals such as methanol; b) electrical power cables; c) fiber optic cables; d) wire rope; e) fillers; f) reinforcements and/or combinations thereof. Some of the subsea oil production facilities are in thousands of feet of water and therefore the conventional subsea umbilicals may be several thousand feet long. The umbilical hangs off an I-tube or a J-tube on the host and connects to the topside umbilical termination assembly (TUTA); subsea, the umbilical often connects to a umbilical termination assembly, referred to in the industry as a UTA.

Conventional subsea umbilicals are typically produced using large expensive machines often referred to as "cabling machines" which are oriented either horizontally or vertically. None of the conventional cabling machines are portable because of their size. Cabling machines typically include one or more rotating heads which dispense steel tubing and/or conduits which contribute to the size and expense of these devices. These prior art tubing dispensing heads rotate about the longitudinal axis of the umbilical production machine, as is well know to those skilled in the art, as the heads warp steel tubing and/or conduits in a helical fashion. The following companies typically use horizontal cabling machines to produce subsea umbilicals: Kvaerner, Oceaneering and Cabett Parker. Aker Kvaerner has a number of subsidiaries and affiliates worldwide. Aker Kaverner Subsea, Inc. which is the subsidiary believed to produce umbilicals has an office located in Houston, Tex. Kvaerner Subsea is believed to produce subsea umbilicals in Mobile, Ala. and Moss, Norway. See www.akerkkvaerner.com. Oceaneering International, Inc. has offices in Houston, Tex. See www.oceaneering.com. Oceaneering produces umbilicals in Panama City, Fla.; Niteroi, Rio de Janeiro, Brazil and Rosyth, Scotland, United Kingdom. Cabett Parker Subsea produces umbilicals at its facility in Freeport, Tex., see www.cabett.com. The following companies typically use vertical cabling machines to produce subsea umbilicals: Nexans and Duco. Nexans is headquarted in Paris, France and has offices located worldwide. See www.nexans.com. Nexans produces umbilicals at its plant in Halden, Norway. Duco, Inc. is a subsidiary of Technip, www-.technip.com, whose headquarters is also located in Paris, France. Duco, Inc. also has an umbilical manufacturing plant in Houston, Tex. Conventional cabling machines have a slow production rate which increases the price of the resulting subsea umbilical.

All of the existing cabling machines wrap the components together in a helical fashion which is referred to as the "lay" of the umbilical. The amount of the lay is expressed in degrees. The lay angle for some prior art umbilicals is from about 3 to about 6 degrees. Umbilicals may be from about 6 inches in diameter to more than 12 inches in diameter. The umbilical may be either right-lay or left-lay.

The following references describe methods for manufacturing umbilicals: GB 2038988; GB 2219063A; U.S. Pat. No. 5,813,106 (Assigned to Kvaerner Energy AS of Oslo, Norway) and U.S. Pat. No.7,047,616 (Assigned to Nexans of Paris, France).

The following references describe various umbilicals: U.S. Pat. No. 7,239,781; U.S. Pat. No. 7,158,703; U.S. Pat. No. 6,612,370; US 2006/0193698; U.S. Pat. No. 6,556,780; U.S. Pat. No. 6,538,198; U.S. Pat. No. 6,472,614; US 2002/0122664; U.S. Pat. No. 6,102,077; U.S. Pat. Nos. 4,726,314 and 3,526,086.

There is a need for umbilical production facilities that are smaller, portable and less expensive to make and operate. The present invention is a method and apparatus to produce non-helically wound umbilicals and the resulting umbilical. The portable embodiment for production of non-helically wound umbilicals is smaller and less expensive to manufacture and operate than cabling machines currently used to produce subsea umbilicals by Kvaerner, Oceaneering, Nexans and Duco. The present invention may be a stationary machine or in another embodiment, it may be portable. The portable embodiment is mounted on one or more skids, unlike the prior art.

SUMMARY OF THE INVENTION

The present invention is a method and apparatus used to produce non-helically wound subsea umbilicals and the umbilicals produced by such apparatus. This machine is more compact and less expensive to manufacture than prior art cabling machines that produce helically wound subsea umbilicals. Unlike the prior art, the present invention does not use rotating heads in the feed section to dispense steel tubing or conduits. The present invention may be mounted on one or more skids which can be placed in intermodal containers to facilitate portability so umbilicals may be produced in remote locations. The present umbilical production machine may be located proximate a dock or other anchorage for marine support vessels so the non-helically wound umbilical is fed directly onto a reel on the support vessel.

DETAILED DESCRIPTION OF THE INVENTION

Figure 1:
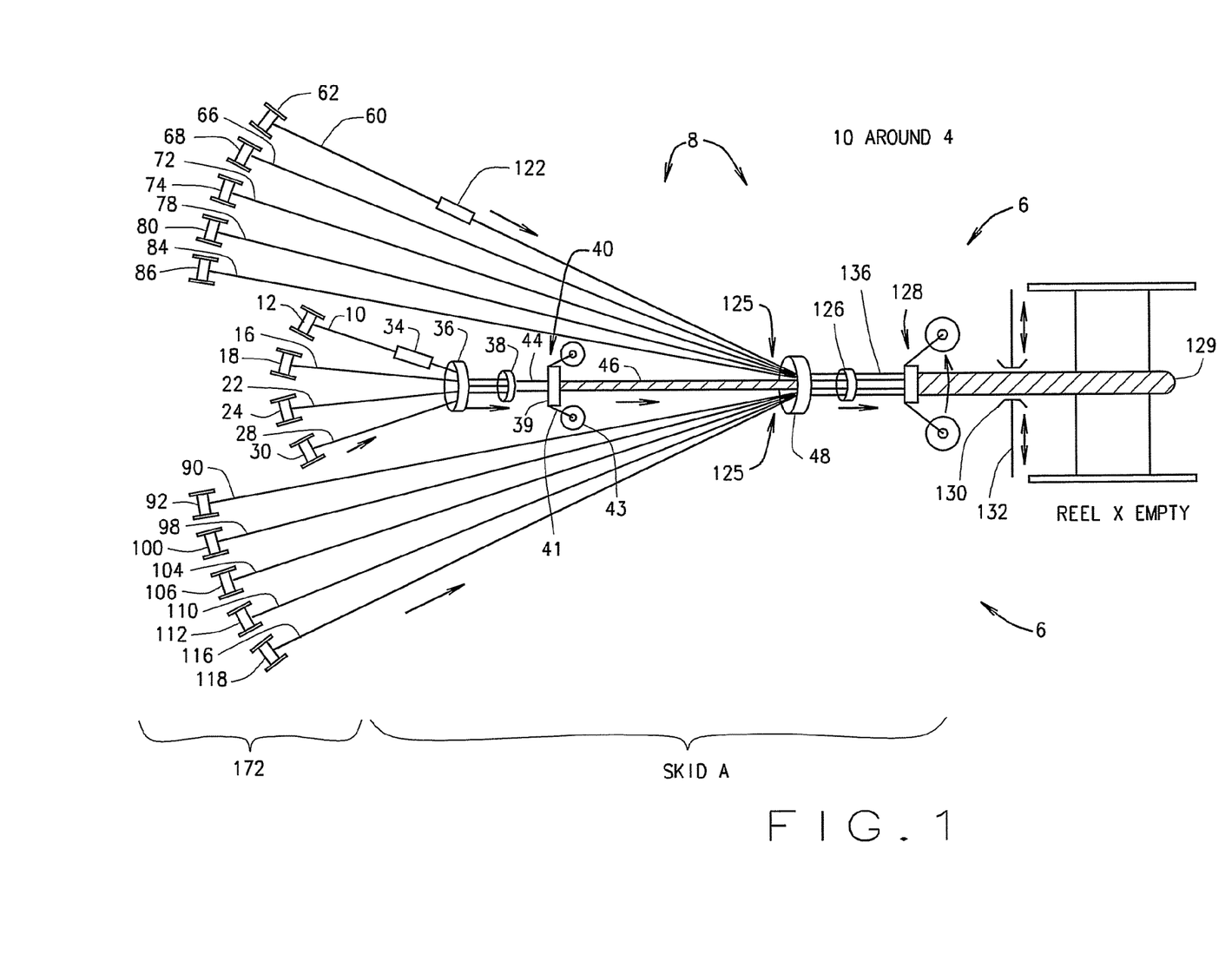
FIG. 1 is a schematic view of a front portion of a machine to produce non-helical umbilicals.

FIG. 1 is a schematic view of a front portion 6 of a machine 8 to produce a non-helical umbilical. The machine 8 includes a front portion 6 shown in FIG. 1 and a rear portion 148 shown in FIG. 2.

Figure 2:
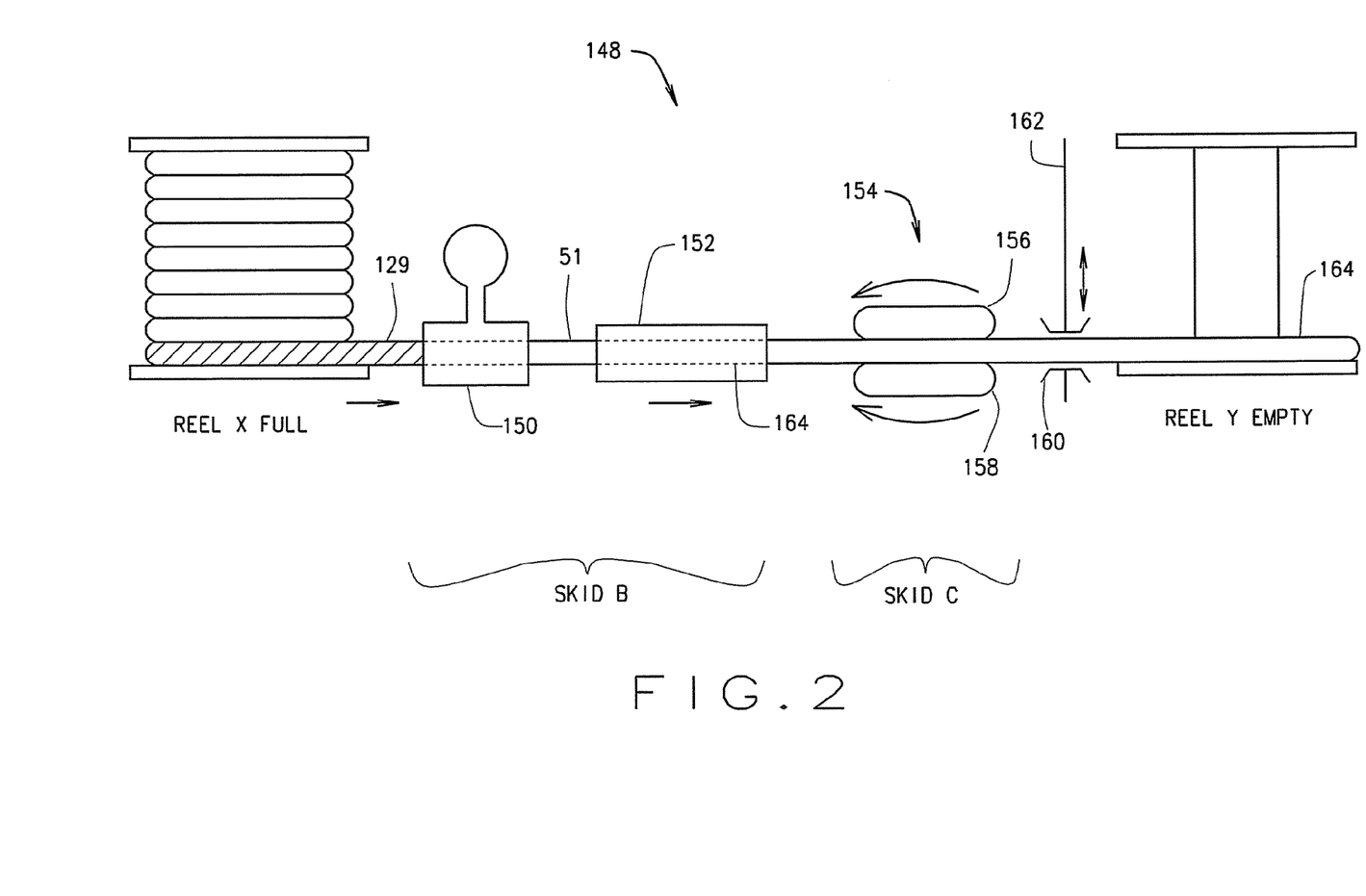
FIG. 2 is a schematic view of a rear portion of a machine to produce non-helical umbilicals.

The machine shown in FIG. 1 and 2 may produce any type of umbilical. In FIGS. 1 and 2 it is configured to produce a "10 around 4" type umbilical, as better seen in section view in FIG. 3. The "4" refers to the four inner conduits and the "10" refers to the ten outer conduits. This machine may be reconfigured to produce other types of umbilicals such as those shown in FIGS. 4 and 5, and other types of umbilicals, not shown. For different configurations, the feed section 172 is modified from that shown in FIG. 1 as will be appreciated by those skilled in the art. For example, to make the 12 around 6 umbilical of FIG. 4, twelve outer conduit reels are positioned behind 6 inner conduit reels in an alternative design of the feed section. For example, to make the 14 around 8 umbilical of FIG. 5, fourteen outer conduit reels are positioned behind eight inner conduit reels in an alternative design of the feed section.

Referring back to the feed section 172 shown in FIG. 1, a first inner conduit 10 is wound on a first reel 12 which is supported on a first reel stand 14, not shown. A second inner conduit 16 is wound on a second reel 18 which is supported on a second reel stand 20, not shown. A third inner conduit 22 is wound on a third reel 24 which is supported on a third reel stand 26, not shown. A fourth inner conduit 28 is wound on a fourth reel 30 which is supported on a fourth reel stand 32, not shown. Various reel stands and carousels are known to those skilled in the art. They may include a drive means, such as a motor to facilitate turning of the heavy reels. This feed section may be described as "stationary" relative to the rest of the machine because the reels, reel stands and/or carousels do not rotate abut the longitudinal axis of the machine 8, like the prior art. One of the reasons the present invention is smaller and more economical to produce is because the feed section does not rotate about the longitudinal axis of the machine 8, like prior art rotating heads.

A first back tensioner 34 exerts tension on the first inner conduit 10 in a direction opposite to the direction of movement of the first inner conduit 10. For this reason, the tensioner is referred to as a "back" tensioner. The first inner conduit 10 may also be referred to as the first tensioned inner conduit 10. The back tensioner may also be used to exert tension on any of the other inner conduits. The first back tensioner puts from about 1,500 pounds to about 2,500 pounds and optimally about 2,000 pounds more tension on the first inner conduit 10 than the tension that is on the other inner conduits 16, 22 and 28. Back tensioners are also referred to as cable/pipe tensioners and are off the shelf items from a number of different vendors such as Baricon Systems, Ltd. of Aberdeen, UK, www.baricon.co.uk and Holland Marine Equipment, www.hmel.nl. These cable/pipe tensioners are sometimes also called caterpillar draw machines. In the alternative, a back tensioned reel stand, known to those skilled in the art, may be used in lieu of or in addition to the first back tensioner 34. The back tension results in an irregular lay angle which may also be referred to as a natural or random lay. For example, the tensioned conduit may wrap around the other conduits every 50 feet, every 75 feet or every 100 feet at random. The lay may be either right or left.

The inner conduits 10, 16, 22 and 28 pass through a device to contain and size the plurality of inner conduits, such as the entry guide 36 which may also be called a first fairlead and a first sizing die 38. The inner bundle of conduits then passes through a first taping head assembly 40 which is well known to those skilled in the art. Conventional taping head assemblies may include a taping head 39, a pair of supports 41 and a pair of reels 43. The first taping head assembly 40 is basically the same as the second taping head assembly 128, except the second system is sized to receive a larger bundle of conduits and may use a different size and type of tape.

The first taping head assembly rotates around the cables in the direction of the arrow applying inner tape 42 to the inner bundle 44 of the four inner conduits 10, 16, 22 and 28. Different types of tape may be suitable for this purpose including but not limited to: tape produced from polyester film, sometimes sold under the trademark Mylar®, Nylon® tape, vinyl tape, PVC tape and PTFE tape available from a variety of different vendors such as 3M Company of St. Paul, Minn., www.3m.com; Electro Tape Specialties, Inc. of Odessa, Fla., www.electrotape.com; and Mills Limited of Greenford Middlesex, UK, www.millsltd.com.

A taped bundle of inner conduits 46 then advances to a second entry guide 48 also called a fairlead 48. A first outer conduit 60 is wound on a first outer reel 62 which is supported on a first outer reel stand 64, not shown. A second outer conduit 66 is wound on a second outer reel 68 which is supported on a second outer reel stand 70, not shown. A third outer conduit 72 is wound on a third outer reel 74 which is supported on a third outer reel stand 76, not shown. A fourth outer conduit 78 is wound on a fourth outer reel 80 which is supported on a fourth outer reel stand 82, not shown. A fifth outer conduit 84 is wound on a fifth outer reel 86 which is supported on a fifth outer reel stand 88, not shown.

A sixth outer conduit 90 is wound on a sixth outer reel 92 which is supported on a sixth outer reel stand 94, not shown. A seventh outer conduit 98 is wound on a seventh outer reel 100 which is supported on a seventh outer reel stand 102, not shown. An eighth outer conduit 104 is wound on an eighth outer reel 106 which is supported on a eighth outer reel stand 108, not shown. A ninth outer conduit 110 is wound on a ninth outer reel 112 which is supported on a ninth outer reel stand 114, not shown. A tenth outer conduit 116 is wound on a tenth outer reel 118 which is supported on a tenth outer reel stand 120, not shown.

A second back tensioner 122 applies tension to the first outer conduit 60, the tension being exerted opposite to the direction of movement of the first outer conduit. The first outer conduit 60 may also be referred to as the first tensioned outer conduit 60 because of the tension applied by the second back tensioner 122. The back tensioner 122 may be applied to one of the other outer conduits. The cable pipe tensioners are sometimes also called caterpillar draw machines. The second back tensioner applies a random lay with the same force as the first back tensioner. In the alternative, a back tensioned reel stand, known to those skilled in the art, may be used in lieu of or in addition to the first back tensioner 34 and/or the second back tensioner 122. The tension results in an irregular lay angle which may also be referred to as a random or irregular lay, better seen in FIG. 9. The lay may be either right or left.

A bundle of outer conduits, collectively referred to as 125, and the taped bundle of inner conduits 46 feeds into devices to contain and size the plurality of outer conduits such as the second fairlead 48 and a second sizing die 126. The bundle of outer conduits 136 then passes through and a second taping head assembly 128 which rotates in the direction of the arrow to apply outer tape 127, better seen in FIG. 3. The second taping head assembly may use the same type of tape or different types of tape and sizes as the first taping head assembly.

The taped bundle of outer conduits 129 surrounds the taped bundle of inner conduits 46 which both pass through a winder 130 which is mounted on a shaft 132. The bundles of conduits are then fed onto reel X which is empty in FIG. 1. The winder moves back and forth along the shaft as indicated by the arrows, like the winder in a fishing reel to direct the bundles of conduits onto reel X so they are arranged in an orderly fashion on the reel X.

As shown in FIG. 1 by the bracket A, the first back tensioner 34, the second back tensioner 122, the first entry guide 36, the first sizing die 38, the first taping head assembly 40, the second entry guide 48, the second sizing die 126 and the second taping head assembly 128 may be mounted on a skid, not shown to facilitate portability. A second skid and a third skid are indicated by the brackets B and C in the following figure.

FIG. 2 is a schematic view of a rear portion 148 of the machine to produce non-helical umbilicals 164. Reel X is shown full of the taped bundle of outer conduits 129 which surrounds the taped bundle of inner conduits 146. These bundles of conduits pass through a crosshead extruder 150, well known to those skilled in the art. Crosshead extruders are disclosed in U.S. Patent Nos. 4,361,455; 4,832,588 and 6,716,021 which are incorporated herein by reference. The crosshead extruder applies an jacket 51, better seen in FIG. 3, to the taped bundle of outer conduits 129. The jacket may be plastic, elastomer, rubber and/or combination thereof. Reinforcements, not shown, may be used in the application of the jacket for strength.

The non-helical umbilical 164 then passes through a cooling tunnel 152 at a temperature and rate suitable for cooling the jacket. A caterpillar draw machine 154, well known to those skilled in the art, includes an upper tread assembly 156 and a lower tread assembly 158. The upper tread moves counter-clockwise in the direction of the arrow and the lower tread moves clockwise in the direction of the arrow to pull the umbilical through the cooling tunnel. The completed umbilical 164 may be fed to a carousel, not shown, the reel Y in FIG. 2 or to the reel 376 on vessel 372 better seen in FIG. 8.

A winder 160, well known to those skilled in the art, moves back and forth in the direction of the arrows along the shaft 162, like the winder in a fishing reel, to direct the non-helical umbilical 164 onto the take-up reel Y, which is shown empty in FIG. 2. The bracket B indicates the equipment that may be mounted on skid B, better seen in FIG. 8 and the other bracket C indicates the equipment that may be mounted on skid C, better seen in FIG. 8.

All of the equipment of the machine 8 may be skid mounted. Which pieces are mounted on which skid is not important, so long as they can be arranged substantially in the order shown in FIGS. 1 and 2. The machine 8 is capable of being configured into one or more smaller skid mounted components so it can be portable, unlike the prior art. Preferably, each skid would be able to fit inside an intermodal container.

Intermodal containers are typically produced in various lengths including: 20 ft., 28 ft., 40 ft. and 48 ft. The typical height of an intermodal container is 8 ft. 6 inches; and they are typically 8 ft. wide. The size of the container is up to the designer and is not critical to the present invention so long as it can be used in international commerce on conventional container vessels.

Figure 3:
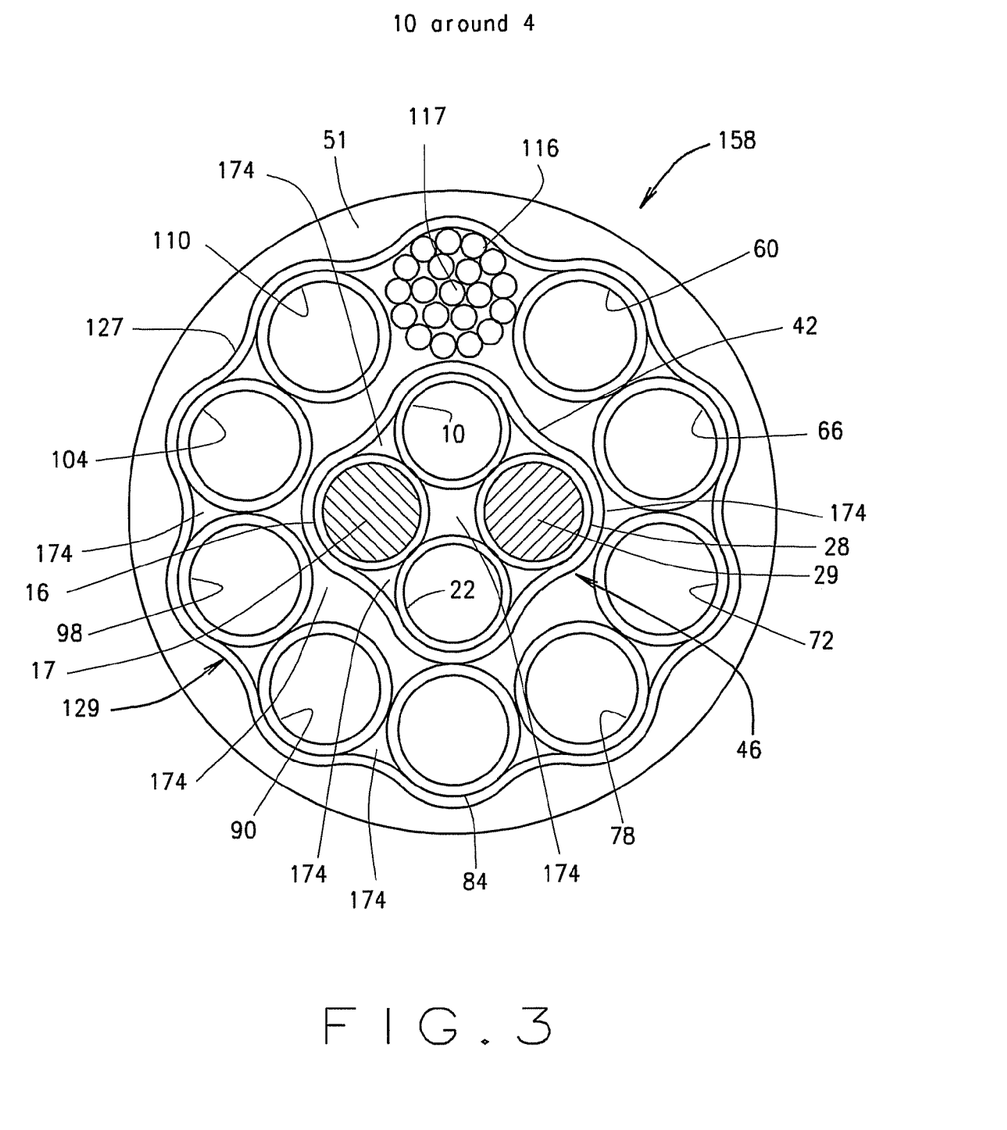
FIG. 3 is a section view of a 10 around 4 umbilical produced by the machine of FIGS. 1 and 2.

FIG. 3 is a section view of a "10 around 4" umbilical 158 produced by the machine 8 of FIGS. 1 and 2. The umbilical 158 is non-helically wound, unlike the prior art. The term "conduit" as used herein includes: a) tubes for fluids including hydraulic fluids and/or chemicals; b) electrical power cables, including those shown in FIGS. 6 and 7; c) fiber optic cables; d) wire rope; e) fillers; f) reinforcements and/or combinations thereof. The umbilical 158 is called 10 around 4 because there are four inner conduits, 10, 16, 22 and 28 surrounded by ten outer conduits, 60, 66, 72, 78, 84, 90, 98, 104, 110 and 116. In this view, conduit 116 is a wire rope 117. In this view, the fourth inner conduit 28 is a fiber optic cable 29 and second inner conduit 16 is an electric power cable 17. To add weight to the umbilical 158 every other outer conduit could be a wire rope or some combination of wire ropes and conduits. Weight may be added to reduce vortex induced vibration which is sometimes referred to in the industry as "strumming."

The inner tape 42 is wound around the four inner conduits, 10, 16, 22 and 28. The outer tape 127 is wound around the ten outer conduits 60, 66, 72, 78, 84, 90, 98, 104, 110 and 116. The jacket 51 is extruded about the outer tape 127 forming a uniform outer circumference. High density polyethylene is often used for the jacket. Fillers, not shown, may be placed in the interstices 174 between the conduits in the umbilical 158. Reinforcements, not shown, may also be used in the umbilical 158. Electrical power cables, not shown, may be used inside of the conduits or in lieu of the conduits. Fiber optic cables, not shown, may be used inside of the conduits or in lieu of the conduits. Power cables may also be placed in some of the interstices.

The inner conduits 10, 16, 22 and 28 and the outer conduits 60, 66, 72, 78, 84, 90, 98, 104, 110 and 116 may be formed from ¼ inch id×1 inch od steel tubing. In a single umbilical, the size of the inner conduits and the outer conduits may vary, depending on the application. For example, in a single umbilical, some of the inner conduits may be ¼ inch nominal diameter steel tubing and others may be larger; in the outer conduits, some of the conduits may be 1 inch nominal diameter and other outer conduits may be smaller. The industry typically uses 2507 super duplex stainless steel tubing for umbilicals and this may also be suitable for the inner and outer conduits in this non-helical umbilical. Other sizes and other types of steel may also be suitable for use in this invention. Electric power cables and/or fiber optic cables may be substituted for the steel tubing. Steel tubing and wire rope may also be substituted for the steel tubing.

Figure 4:
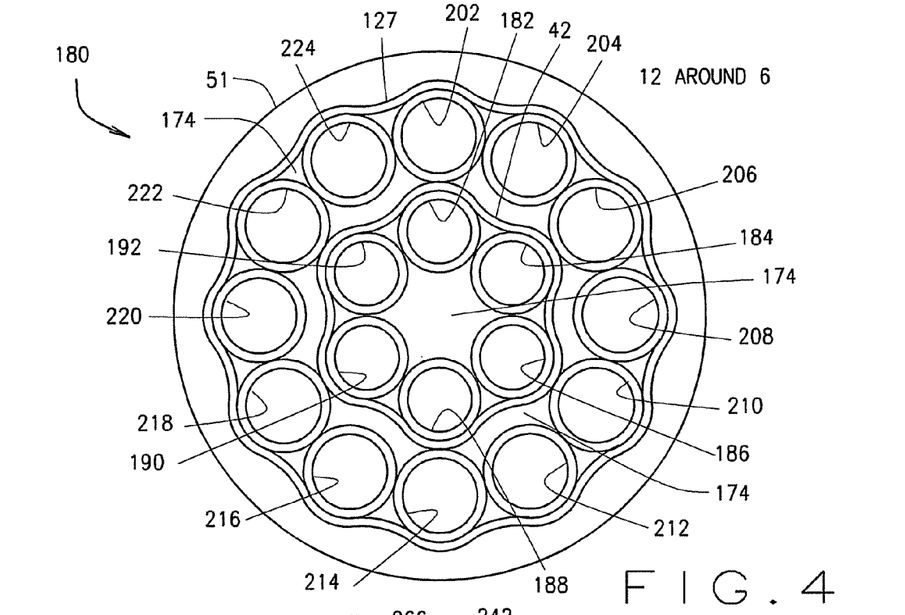
FIG. 4 is a section view of a 12 around 6 umbilical produced by the present invention.

FIG. 4 is a section view of a "12 around 6" umbilical 180 produced by the machine 8 with a reconfigured feed section having 6 inner conduits and 12 outer conduits. The non-helically wound umbilical 180 has six inner conduits 182, 184, 186, 188, 190 and 192 surrounded by the inner tape 42. The umbilical 180 has twelve outer conduits 202, 204, 206, 208, 210, 212, 214, 216, 218, 220, 222 and 224 surrounded by the outer tape 127. A jacket 51 is extruded about the taped bundle of outer conduits to complete the "12 around 6" non-helically wound umbilical 180.

Fillers and/or electric power cables, not shown, may be placed in the interstices 174 between the conduits in the umbilical 180. Reinforcements, not shown, may be used in the umbilical 180. Electrical power cables, not shown, may be used inside of the conduits or in lieu of the conduits. Fiber optic cables, not shown, may be used inside of the conduits or in lieu of the conduits. Wire rope may also be used in lieu of the conduits.

Figure 5:
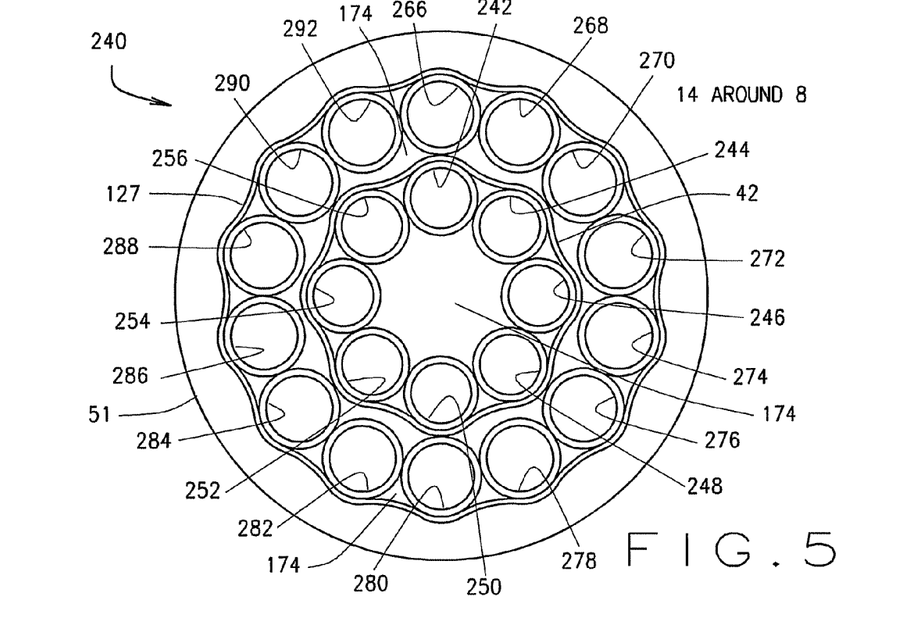
FIG. 5 is a section view of a 14 around 8 produced by the present invention.

FIG. 5 is a section view of a "14 around 8" umbilical 240 produced by the present invention. The non-helically wound umbilical 240 has eight inner conduits 242, 244, 246, 248, 250, 252, 254 and 256. The inner tape 42 is wound around the inner bundle of conduits. The umbilical 240 has fourteen outer conduits, 266, 268, 270, 272, 274, 276, 278, 280, 282, 284, 286, 288, 290 and 292. The outer tape 127 is wound around the outer bundle of conduits. A jacket 51 is extruded about the taped bundle of outer conduits.

Fillers and/or electric power cables, not shown, may be placed in the interstices 174 between the conduits in the umbilical 240. Reinforcements, not shown, may be used in the umbilical 240. Electrical power cables, not shown, may be used inside of the conduits or in lieu of the conduits. Fiber optic cables, not shown, may be used inside of the conduits or in lieu of the conduits. Wire rope may be used in lieu of the conduits.

Figure 6:
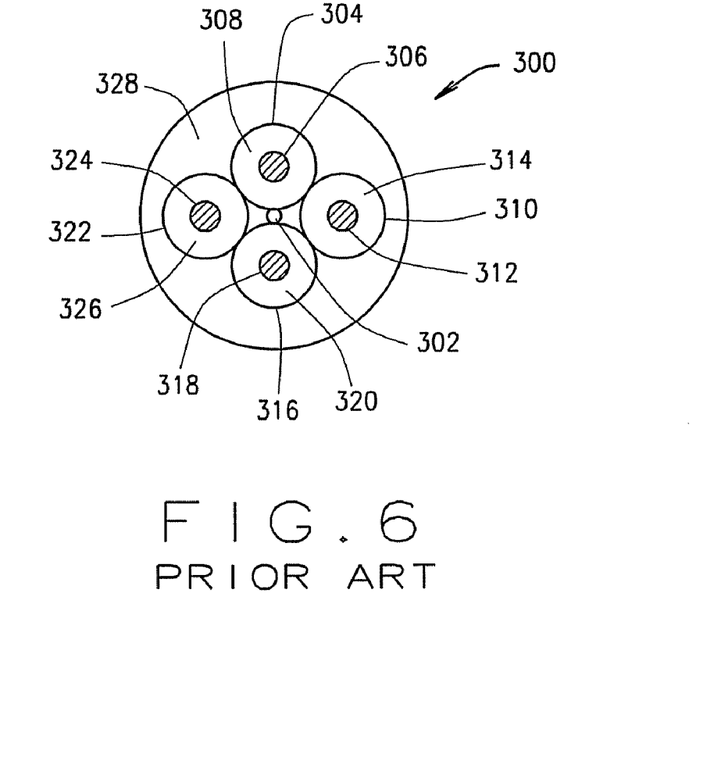
FIG. 6 is a section view of a prior art power cable.

FIG. 6 is a section view of a prior art electric power cable 300, which is sometimes referred to in the industry as a "6 mm² quad" cable. This type of cable or a suitable equivalent is available off the shelf from a number of companies such as The Rochester Corporation, a division of Tyco International Limited of Culpeper, Va., see www.rochestercables.com; JDR Cable Systems (Holdings) Ltd. of Houston, Tex., see www.jdrcables.com and NSW a member of the General Cable Corporation, North American headquarters in Highland Heights, Ky., worldwide headquarters in Nordenham, Germany, see www.nsw.com. One of more fillers 302 may be placed in the quad power cable 300. The quad power cable 300 includes a first electric power cable 304 having a conductor 306 surrounded by an insulating sheath 308. The power cable 300 also includes a second electric power cable 310 having a conductor 312 surrounded by an insulating sheath 314. The power cable 300 also includes a third electric power cable 316 having a conductor 318 surrounded by an insulating sheath 320. The power cable further includes a fourth electric power cable 322 having a conductor 324 surrounded by an insulating sheath 326. The conductors 306, 312, 318 and 324 may be stranded or solid core wire formed from copper or any other electrical conductor such as silver, aluminum, etc. The insulating sheaths 308, 314, 320 and 326 may be formed from any one of several dielectric materials; FEP is commonly used in the industry as an insulating sheath. FEP means fluorinated ethylene propylene which is sold under the brand name Teflon-FEP by DuPont and others. An outer jacket 328 is extruded about the four power cables and is often formed from polyurethane. The "quad" power cable 300 is so called in the industry because it contains four electrical conductors that are twisted around each other in a helical fashion.

Figure 7:
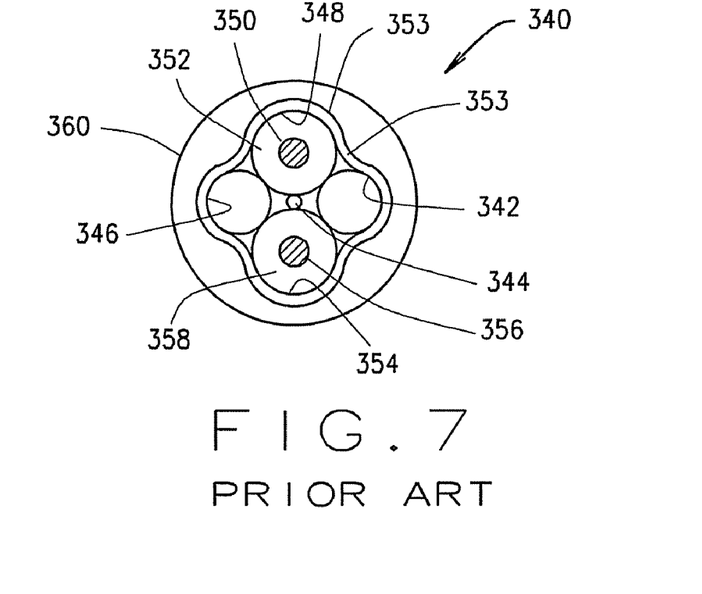
FIG. 7 is a section view of a prior art power cable.

FIG. 7 is a section view of prior art electric power cable 340 which is sometimes referred to in the industry as a "6 mm² twisted pair." This type of cable is available off the shelf from a number of companies such as The Rochester Corporation, a division of Tyco International Limited of Culpeper, Va., see www.rochestercables.com; JDR Cable Systems (Holdings) Ltd. of Houston, Tex., see www.idrcables.com and NSW a member of the General Cable Corporation, North American headquarters in Highland Heights, Ky., worldwide headquarters in Nordenham, Germany, see www.nsw.com. One of more fillers 342, 344 and 346 may be placed in the power cable 340. The power cable 340 includes a first electric power cable 348 having a conductor 350 surrounded by an insulating sheath 352. The power cable also includes a second electric power cable 354 having a conductor 356 surrounded by an insulating sheath 358. The conductors 350 and 356 may be stranded or solid core wire formed from copper or any other electrical conductor such as silver, aluminum, etc. The insulating sheaths 352 and 358 may be formed from any one of several dielectric materials; FEP is commonly used in the industry. An outer jacket 328 is extruded about the two power cables and is often formed from polyurethane. The "twisted pair" power cable 340 is so called in the industry because it contains two electrical conductors that are twisted around each other in a helical fashion.

Figure 8:
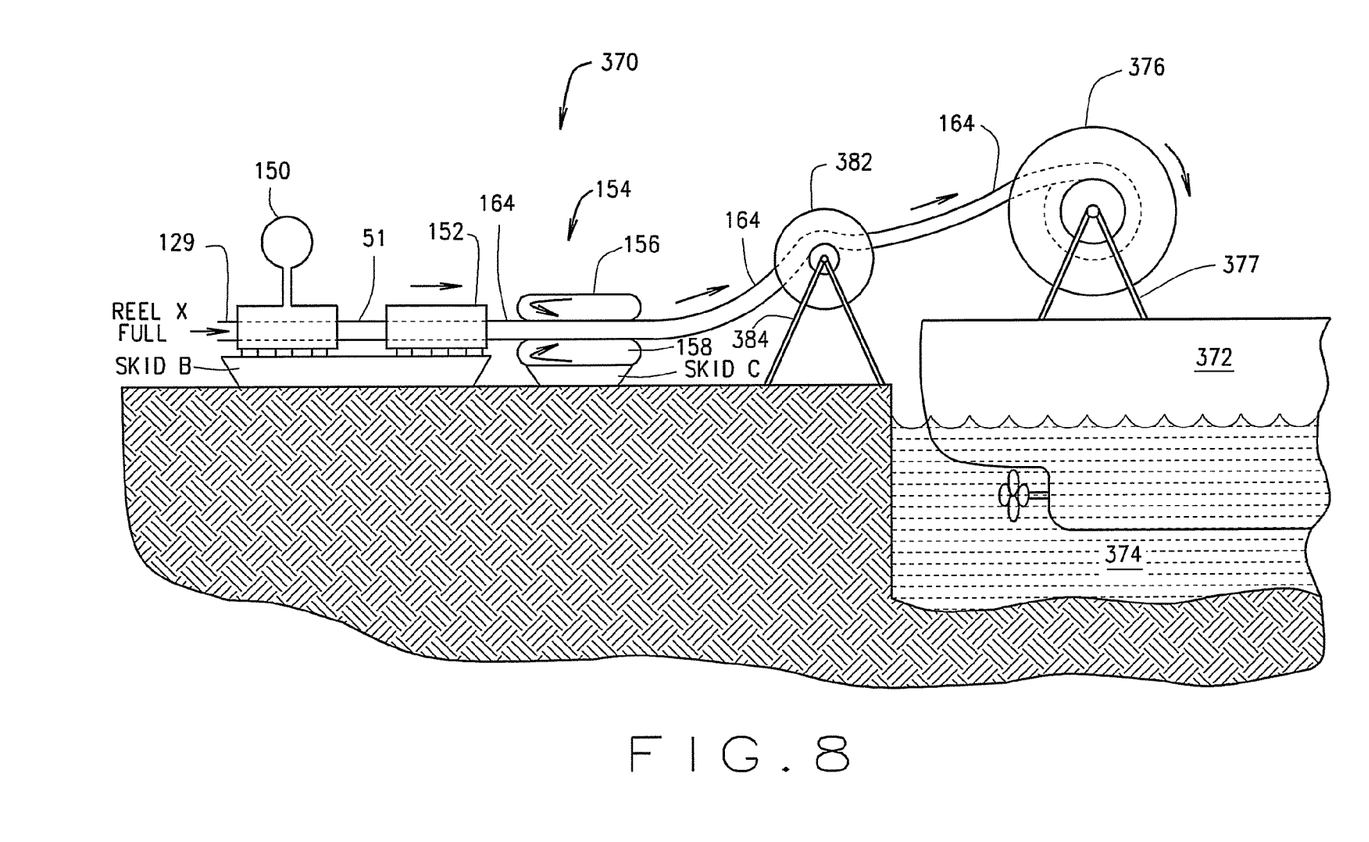
FIG. 8 is a perspective view of an onshore spooling base with non-helical umbilical being loaded directly on a support vessel, instead of a take up reel.

FIG. 8 is a perspective view of an onshore spooling base 370 with a non-helical umbilical being loaded directly on a support vessel 372, instead of a take up reel. The spooling base is located near a dock, not shown or other location accessible to deep water marine support vessels 372. The vessels float on the water 374. The onshore spooling base is an economical way to produce non-helical umbilicals because the umbilicals move directly from the production line to the support vessel. Several producers of prior art umbilicals have onshore spooling bases with stationary equipment. The present may be configured in a portable embodiment using skids to enable production in a remote location.

This support vessel 372 includes an onboard reel 376 or carousel, not shown. The on board reel 376 may have a diameter of 100 ft. or more and is intended to hold a long piece of umbilical. The onboard reel 376 is mounted on a reel stand 377 or other suitable support for the heavy load. The vessel is intended to a) receive the finished umbilical from the machine for production of non-helically wound umbilicals; b) store long lengths of umbilical on the onboard reel 376 or onboard carousel; c) transport the umbilical to a suitable offshore location and d) install the umbilical in a suitable offshore location, among a host of other functions.

As previously discussed, the machine 8 for production of non-helically wound umbilicals includes a front portion 6 shown in FIG. 1 and a rear portion 148 shown in FIG. 2. The primary components of this machine may be skid mounted to create different portable modules, depending on the choice of the designer. For example, one arrangement is to put the components on three skids A, B and C as indicated by the brackets in FIGS. 1 and 2. The designer may choose to use two skids or four skids or yet another arrangement depending on the type of umbilical being produced and other design criterion. In this example, Skid A is not shown. Skids B and C are best seen in FIG. 8. These skids may be put in intermodal containers and shipped anywhere in the world to set up a production facility or the onshore spooling base 370. Skid A, not shown, may be configured to carry the first back tensioner 34, the second back tensioner 122, the first fairlead 36, the first sizing die 38, the first taping head assembly 40, the second fairlead 48, the second sizing die 126, and the second taping head assembly 128. Skid B may be configured to carry the crosshead extruder 150 and the chilling tunnel 152. Skid C may be configured to carry the caterpillar draw machine 154. The non-helical umbilical 164 then passes over a pulley 382 which rotates on a pulley stand 384. The non-helical umbilical then is wound on the onboard reel/carousel 376. A winder 380, not shown, distributes the finished umbilical on the reel/carousel 376.

The onshore spooling base 370 includes the feed section 172 and the other components of FIG. 1. The feed section may include a plurality of reels, as shown in FIG. 1 or carousels, not shown. The reels in FIG. 1 are shaft driven and this shaft is generally horizontal to the ground. In the alternative carousels, not shown, may be used. Carousels are also shaft driven, but this shaft is generally vertical to the ground. Reels, reel stands and carousels are well known to those skilled in the art. Each reel stand and/or carousel may include a motor to rotate the heavy reel. The back reel stands may also include a motor to put tension on the conduit.

The method for producing non-helical umbilicals may be a one step or a two step process. The process shown in FIGS. 1 and 2 is a two step process and is preferred. The reason two steps may be more practical is because the extrusion process of FIG. 2 is a continuous production technique. In contrast, the forming of the taped bundle of inner conduits surrounded by the taped bundle of outer conduits of FIG. 1 is not continuous. So in step one, reel X is filled with the taped bundle of inner conduits 46 surrounded by the taped bundle of outer conduits 129. Then in step two, a full reel X feeds the continuous part of the assembly line of FIG. 2.

The feed section 172 shown in FIG. 1 uses reels filled with conduits. Some or all of which may be super duplex stainless steel tubing, mentioned above. The super duplex tubing comings on reels and in straight lengths. The reels are filled with about 40,000 feet of continuous tubing. These reels have about an 8 ft. diameter. Use of reels in the feed section as shown in FIG. 1 is believed to be the fastest way to produce the non-helical umbilical of the present invention. In an alternative embodiment, the feed section 172 of this machine could also use straight tubing with an array of welders, not shown. The straight tube pieces come in lengths of about 40 feet.

The front portion 6 of the machine 8 as shown in FIG. 1 uses two taping head assemblies 40 and 128 to apply the inner tape 42 and the outer tape 127. Those skilled in the art will recognize that the same result could be achieved with the use of only one taping head assembly in which the outer bundle of conduits 136 is accumulated on a reel and simply run through the first taping head a second time.

Figure 9:
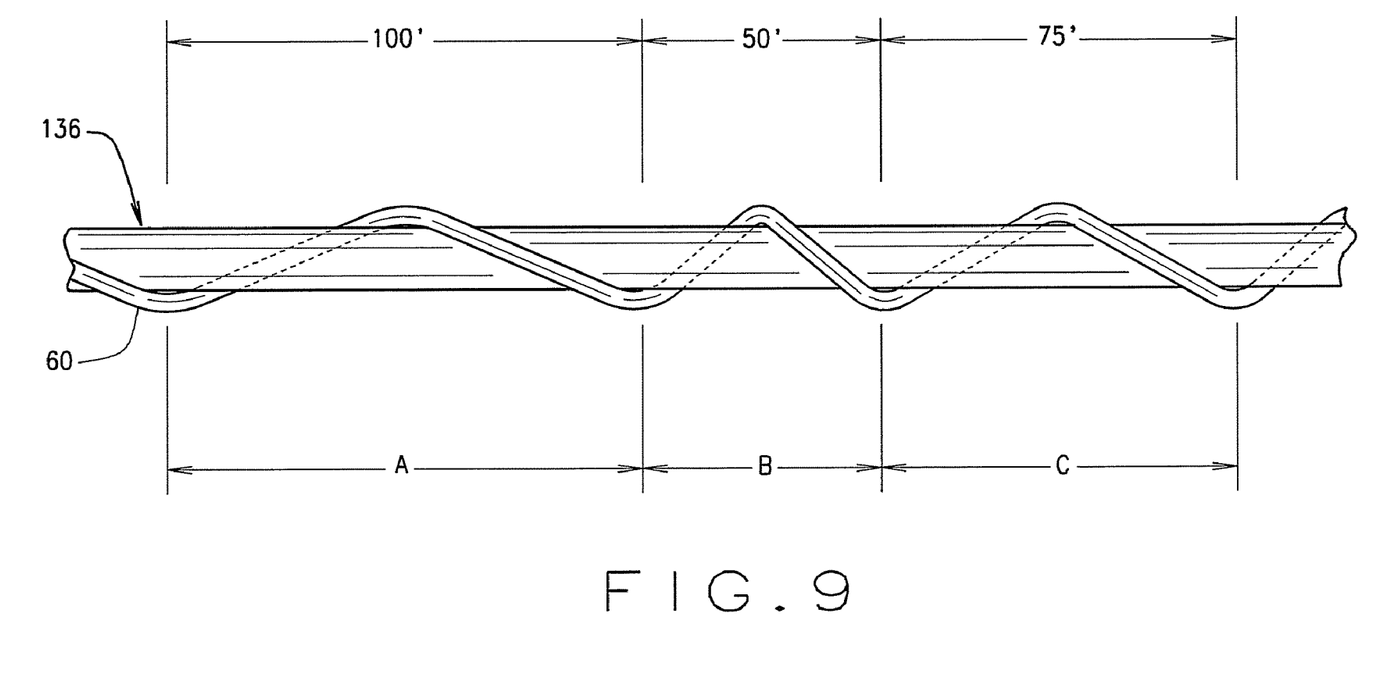
FIG. 9 is an isometric view of outer bundle of conduits with emphasis on the random lay of the first tensioned outer conduit.

FIG. 9 is an isometric view of outer bundle of conduits 136 with emphasis on the random lay of the first tensioned outer conduit 60. This is an example of the conduits produced by the present invention having a random lay angle which is believed to produce random distances between each wrap of the tensioned conduit. In the first segment A, the distance between the wraps is about 100 feet. In the second segment B, the distance between the wraps is about 50 feet and in the third segment C, the distance between the wraps is about 75 feet. The distance between the wraps is believed to be random because the lay angle is random and the order in which the wraps occur is likewise believed to be random because of the second back tensioner 122. In the alternative, the first wrap could be 50 feet, not shown, the second wrap could be 100 feet, not shown and the third wrap could be 75 feet, not shown. Because the distances are non-uniform and because the order in which the wraps occur is irregular, they are referred to as random or natural.

Method for Manufacture of a Non-Helical Umbilical

The method for manufacture of a non-helical umbilical may utilize a permanent manufacturing facility or the method may utilize a portable facility that is preferably mounted on one or more skids. First the feed section 172 of the apparatus must be set up. The feed section may use reels and reel stands as shown in FIG. 1, it may use carousels or it may use an array of welders welding together straight sections of conduit. The exact configuration of the feed section depends on the type of umbilical that needs to be produced. For example, if a 10 around 4 umbilical is desired, the feed section will look like FIG. 1 with 4 inner conduits and 10 outer conduits being fed into the machine 8.

In the alternative if a 12 around 6 umbilical is desired, the feed section will look slightly different. There will be 6 reels or carousels feeding inner conduits and there will be 12 reels or carousels feeding outer conduits. If a 14 around 8 umbilical is desired, the feed section will be different. There will be 8 reels or carousels feeding inner conduits and there will be 14 feeding outer conduits. Other types of conduits will require different arrangements in the feed section 172. The first back tensioner 34 and/or a back tensioned reel stand places back tension on inner conduit 10. The first tensioner puts from about 1,500 pounds to about 2,500 pounds and optimally about 2,000 pounds more tension on the first inner conduit 10 than the amount of tension that is on the other inner conduits. Likewise, the second back tensioner 122 and/or a back tensioned reel stand places back tension on the outer conduit 60 using about the same amount of force as the first back tensioner. The tension is applied in the direction opposite to the flow of movement of the conduits as shown by the flow arrows in FIG. 1. This back tension causes a irregular or random lay angle which creates the non-helical umbilical.

The inner conduits pass through the entry guide or fairlead 36 and through the sizing die 38. A layer of inner tape is applied by the first taping head system 40. Likewise the outer conduits pass through the entry guide or fairlead 48 and through the sizing die 126. A layer of outer tape is applied by the second taping head system 128.

In one embodiment, the method involves two steps. First, the taped bundle of outer conduits 129 is wound on an empty take up reel X. When several reels have been filled, step two begins. A full reel X feeds the taped bundle of outer conduits 129 into a cross head extruder 150 which applies a jacket 51. The non-helical umbilical 164 then passes through a chilling tunnel 152 to cool the jacket. The non-helical umbilical is pulled through the chilling tunnel and the cross head extruder by a caterpillar draw machine 164 which may also be called a pipe tensioner or cable tensioner. The treads of the caterpillar draw machine move in opposite directions as shown by the flow arrows in FIG. 2 to pull the non-helical umbilical. The umbilical passes through a winder 160 and is wound on a take up reel y or a carousel not shown or may be fed onto a reel on board a support vessel as shown in FIG. 8.

In another embodiment, the method is a one step process. In the one step version, not shown, the wrapped bundle of outer conduits 129 of FIG. 1 is fed directly into the cross head extruder of FIG. 2. This eliminates the need for the take up reel X and transportation from one station as shown in FIG. 1 to the next station in FIG. 2. In this fashion, the non-helical umbilical feed directly from FIG. 1 to FIG. 2 and onto a take up reel, carousel or a reel on board a support vessel.

In summary, the method includes:
feeding a plurality of inner conduits into an umbilical production machine;
placing back tension on at least one of the inner conduits to create a random twist on a bundle of inner conduits;
applying tape to the bundle of inner conduits to produce a taped bundle of inner conduits;
feeding a plurality of outer conduits into an umbilical production machine to surround the taped bundle of outer conduits;
placing back tension on at least one of the outer conduits to create a random twist in the bundle of outer conduits;
applying tape to the bundle of outer conduits to produce a taped bundle of outer conduits; and
applying an extruded jacket about the taped bundle of outer conduits.

The invention claimed is:

1. A method for production of a non-helically wound subsea umbilical comprising the following steps:
feeding a plurality of inner conduits into an umbilical production machine;
placing back tension on at least one of the inner conduits to create a random twist on a bundle of inner conduits;
applying tape to the bundle of inner conduits to produce a taped bundle of inner conduits;
feeding a plurality of outer conduits into an umbilical production machine to surround the taped bundle of outer conduits;
placing back tension on at least one of the outer conduits to create a random twist in the bundle of outer conduits;
applying tape to the bundle of outer conduits to produce a taped bundle of outer conduits; and
applying an extruded jacket about the taped bundle of outer conduits.

2. The method of claim 1 wherein at least one of the inner conduits is an electric power cable.

3. The method of claim 1 wherein at least one of the inner conduits is a fiber optic cable.

4. The method of claim 1 wherein at least one of the outer conduits is wire rope.

5. The method of claim 1 wherein at least one of the inner conduits and at least one of the outer conduits is metallic tubing.

6. A subsea umbilical produced by the method of claim 1.

7. A machine for production of a subsea umbilical comprising:
- a plurality of inner feed devices each feeding at least one inner conduit to a first fairlead and a first sizing die to produce an inner bundle of conduits;
- at least one back tension apparatus applying back tension to at least one inner conduit;
- a first taping head assembly to apply tape to the inner bundle of conduits;
- a plurality of outer feed devices each feeding at least one outer conduit to a second fairlead and a second sizing die to produce an outer bundle of conduits surrounding the taped inner bundle of conduits;
- at least one back tension apparatus applying back tension to at least one outer conduit;
- a second taping head assembly to apply tape to the outer bundle of conduits;
- a first reel to receive the taped bundle of outer conduits;
- a crosshead extruder to apply a jacket to the taped bundle of outer conduits;
- a chilling tunnel to cool the jacket; and
- a caterpillar draw machine to pull the umbilical through the chilling tunnel.

8. The machine of claim 7 wherein:
- the at least one back tension apparatus, the first fairlead, the first sizing die, the first taping head assembly, the second fairlead, the second sizing die and the second taping head assembly are mounted on a portable first skid sized and arranged to fit inside a first intermodal container;
- the crosshead extruder and the chilling tunnel are mounted on a portable second skid sized and arranged to fit inside a second intermodal container; and
- the caterpillar assembly is mounted on a portable third container sized and arranged to fit inside a third intermodal skid.

9. The machine of claim 7 wherein the completed subsea umbilical is fed to a take-up reel.

10. The machine of claim 7 wherein the completed subsea umbilical is fed to a take-up reel on a vessel.

11. A machine for production of a subsea umbilical comprising:
- means for feeding inner conduits and outer conduits into the front portion of the machine, said means for feeding inner conduits and outer conduits being stationary relative to the front portion of the machine;
- means for applying back tension to at least one outer conduit and at least one inner conduit;
- means for wrapping tape about a bundle of inner conduits and means for wrapping tape about a bundle of outer conduits;
- means for applying a jacket about the bundle of outer conduits;
- means for cooling the newly applied jacket;
- means for pulling the umbilical through the means for cooling; and
- means for receiving and storing the umbilical, prior to installation.

* * * * *